REVERSIBLE TWO SPEED TAPE DRIVE

Filed Sept. 26, 1962

INVENTORS.
IRWIN L. DELIN,
DANIEL P. DONCASTER &
BY ROBERT E. MOLL
Brumbaugh, Free, Graves & Donohue
their ATTORNEYS

REVERSIBLE TWO SPEED TAPE DRIVE

Filed Sept. 26, 1962

10 Sheets-Sheet 2

INVENTORS.
IRWIN L. DELIN,
DANIEL P. DONCASTER &
ROBERT E. MOLL
BY
Brumbaugh, Free, Graves & Donohue
their ATTORNEYS Nov. 14, 1967 I. L. DELIN ETAL 3,352,169

REVERSIBLE TWO SPEED TAPE DRIVE

Filed Sept. 26, 1962 10 Sheets-Sheet 3

INVENTORS.
IRWIN L. DELIN,
DANIEL P. DONCASTER &
BY ROBERT E. MOLL
Brumbaugh, Free, Graves & Donohue
their ATTORNEYS

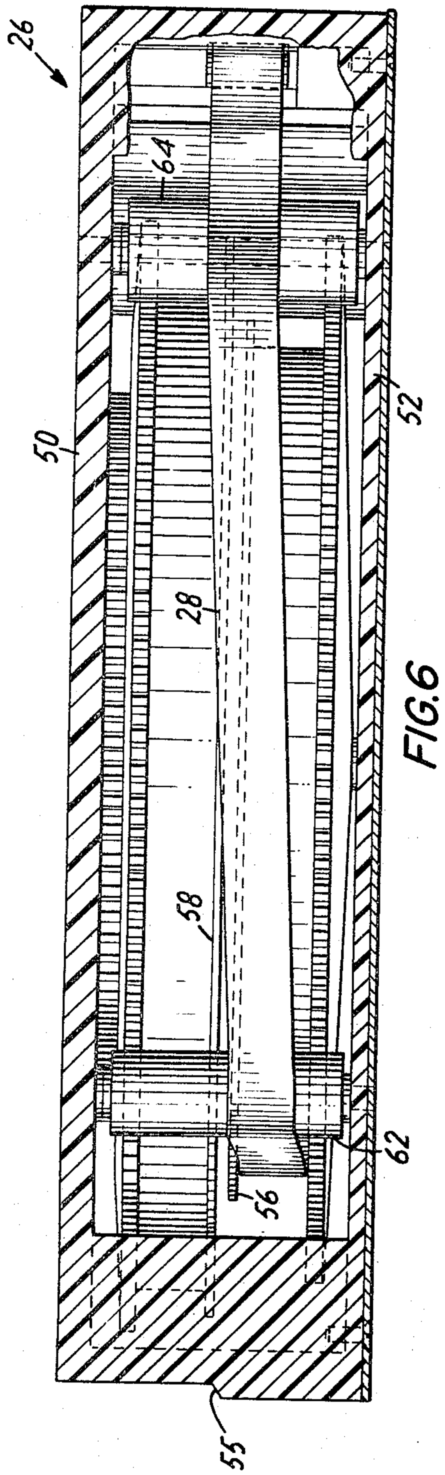
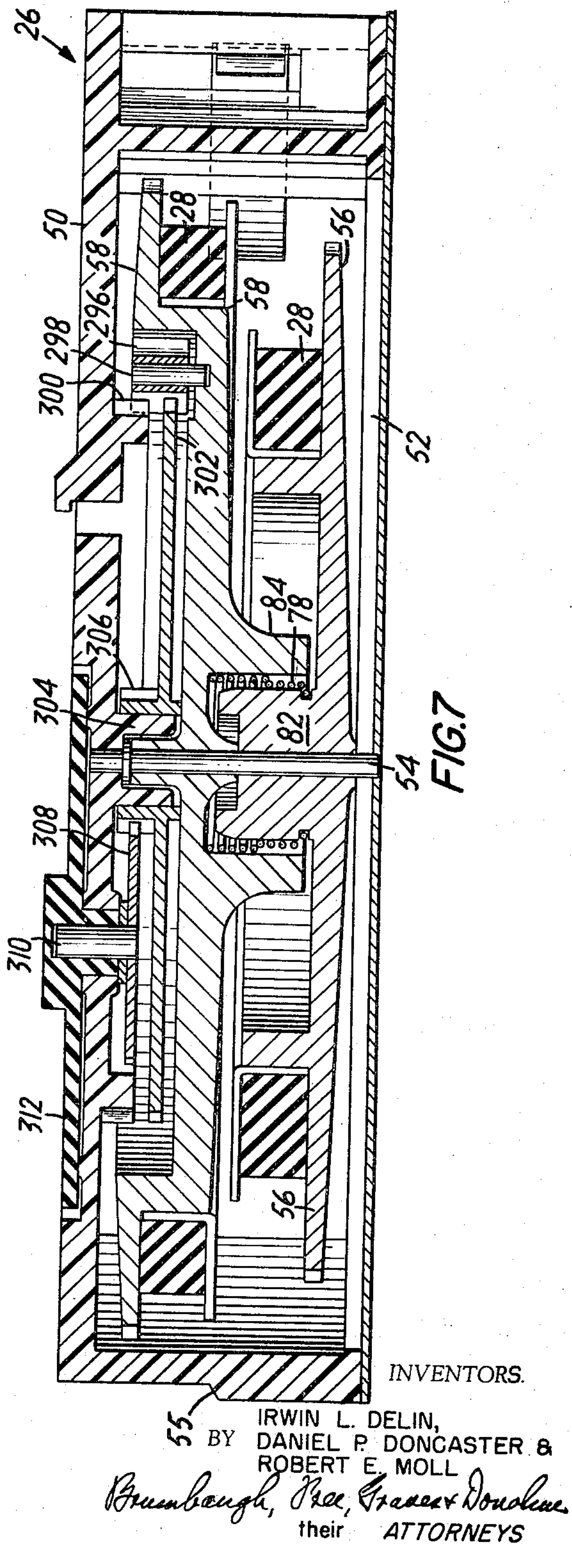
FIG.7
INVENTORS.
IRWIN L. DELIN,
DANIEL P. DONCASTER &
ROBERT E. MOLL
BY Brumbaugh, Free, Graves & Donohue
their ATTORNEYS INVENTORS.
IRWIN L. DELIN,
DANIEL P. DONCASTER &
BY ROBERT E. MOLL
Brumbaugh, Free, Graves & Donohue
their ATTORNEYS INVENTORS.
IRWIN L. DELIN,
DANIEL P. DONCASTER &
BY ROBERT E. MOLL
Brumbaugh, Free, Graves & Donohue
their ATTORNEYS INVENTORS.
IRWIN L. DELIN,
DANIEL P. DONCASTER &
ROBERT E. MOLL
BY
Brumbaugh, Free, Graves & Donohue
their ATTORNEYS INVENTORS.
IRWIN L. DELIN,
DANIEL P. DONCASTER &
BY ROBERT E. MOLL
Brumbaugh, Free, Graves & Donohue
their ATTORNEYS INVENTORS.
IRWIN L. DELIN,
DANIEL P. DONCASTER &
ROBERT E. MOLL
BY
Brumbaugh, Free, Graves & Donohue
their ATTORNEYS INVENTORS.
IRWIN L. DELIN,
DANIEL P. DONCASTER &
ROBERT E. MOLL
BY
Brumbaugh, Free, Graves & Donohue
their ATTORNEYS United States Patent Office 3,352,169 Patented Nov. 14, 1967

3,352,169
REVERSIBLE TWO SPEED TAPE DRIVE
Irwin L. Delin, Southport, Conn., Daniel P. Doncaster, Rye, N.Y., and Robert E. Moll, Fairfield, Conn., assignors to Columbia Broadcasting System, Inc., New York, N.Y., a corporation of New York
Filed Sept. 26, 1962, Ser. No. 226,234
11 Claims. (Cl. 74—194)

This invention relates to recording-reproducing apparatus and, more particularly, to a pocket size dictating machine.

In the past, dictating machines typically have been bulky and of a relatively large size, thereby not portable and limited in use almost exclusively to the office. With the advent of solid-state electronics, characterized by electrical components of relatively small size, dictating machines have been considerably reduced in size, rendering them fairly portable and capable of being hand-carried from one place to another. The changes in electronic components, however, have not been sufficient by themselves to render the entire dictating machine small enough so that it may be carried conveniently in a pocket of the user, for example, to render the apparatus truly portable and susceptible of use anywhere. Heretofore, to make any machine truly "pocket-size," changes in machine functions have been made, usually involving the omission of particular functions such as fast forward operation, back-spacing, and automatic marking of a record, for example. The omission of such functions, however, transforms the machine from a dictating machine into a simple recorder, and this cannot be tolerated when it is necessary to provide a machine for business use with all the functions of a dictating machine.

The present invention provides a pocket-size dictating machine which incorporates all of the dictating machine functions, functions which heretofore normally could be supplied only by a much larger size unit. Briefly, the invention includes a compact and easily removable tape cartridge having therein a tape transport mechanism formed from a supply hub and a take-up hub mounted for rotation and carrying a recording tape thereon which is adapted to be transferred from one hub to the other past a recording-reproducing transducer. The two hubs are coupled together by a slipping spring clutch arrangement so that when the tape is withdrawn from one hub, the other hub is rotated at a speed sufficient to maintain a predetermined tape tension.

One of the hubs is also adapted to drive a marker table that forms part of the cartridge and which carries thereon an indicating card that is moved in accordance with the movement of the hub and therefore the transfer of the tape between the hubs. A stylus positioned above the marker table marks the indicating card and provides an indication of the commencement and finishing of letters and the insertion of corrections into the recording tape, for example, to aid a stenographer or secretary in the transcription of the material recorded on the tape. By keying the marker table and the hub together, problems of alignment between the tape and the marked card are completely avoided if the cartridge is removed for transcription, since the tape transport and card marking arrangements form one unit.

The invention also includes a unique tape drive mechanism that incorporates a capstan to drive the tape past the recording-reproducing transducer. The capstan is driven by a motor which is adapted to be selectively pivoted to vary the rate and direction of rotation of the capstan to facilitate the change from normal speed forward operation to fast speed rewind, for example. Further apparatus is also included to control independently the direction of capstan rotation for the purpose of momentary fast forward speed operation, for example.

In addition, the invention incorporates a primary switching mechanism that determines the mode of operation, i.e., dictation or playback, with a rewind control that accomplishes a rewinding of the tape from the take-up hub to the supply hub automatically at a fast speed. Further, a speed control mechanism is included to govern the speed of tape movement in forward operation to give normal speed forward for playback or dictation purposes, for example, or fast forward speed for "searching" purposes during playback. Positive protection is provided, however, to prevent fast forward speed in the normal dictation mode of operation.

The invention also includes a unique arrangement for attaching an end of the recording tape in an associated hub. This incorporates a resilient sleeve about which the tape end is wrapped, and the sleeve and the tape are inserted into a corresponding opening in the periphery of the hub.

These and other features are described in detail in the following description, which is to be read in conjunction with the appended drawings in which.

Figure 1:
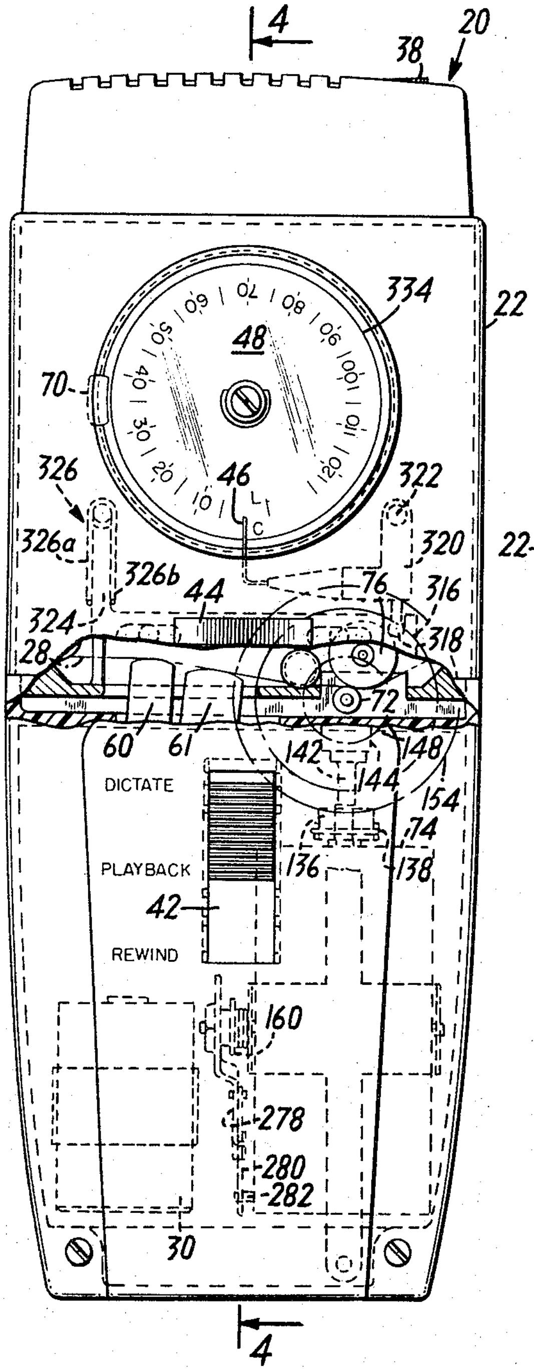
FIG. 1 is an enlarged, partially cut-away top view of a pocket-size dictating machine in accordance with the invention.
Figures 3, 4A, 4B, 4C:
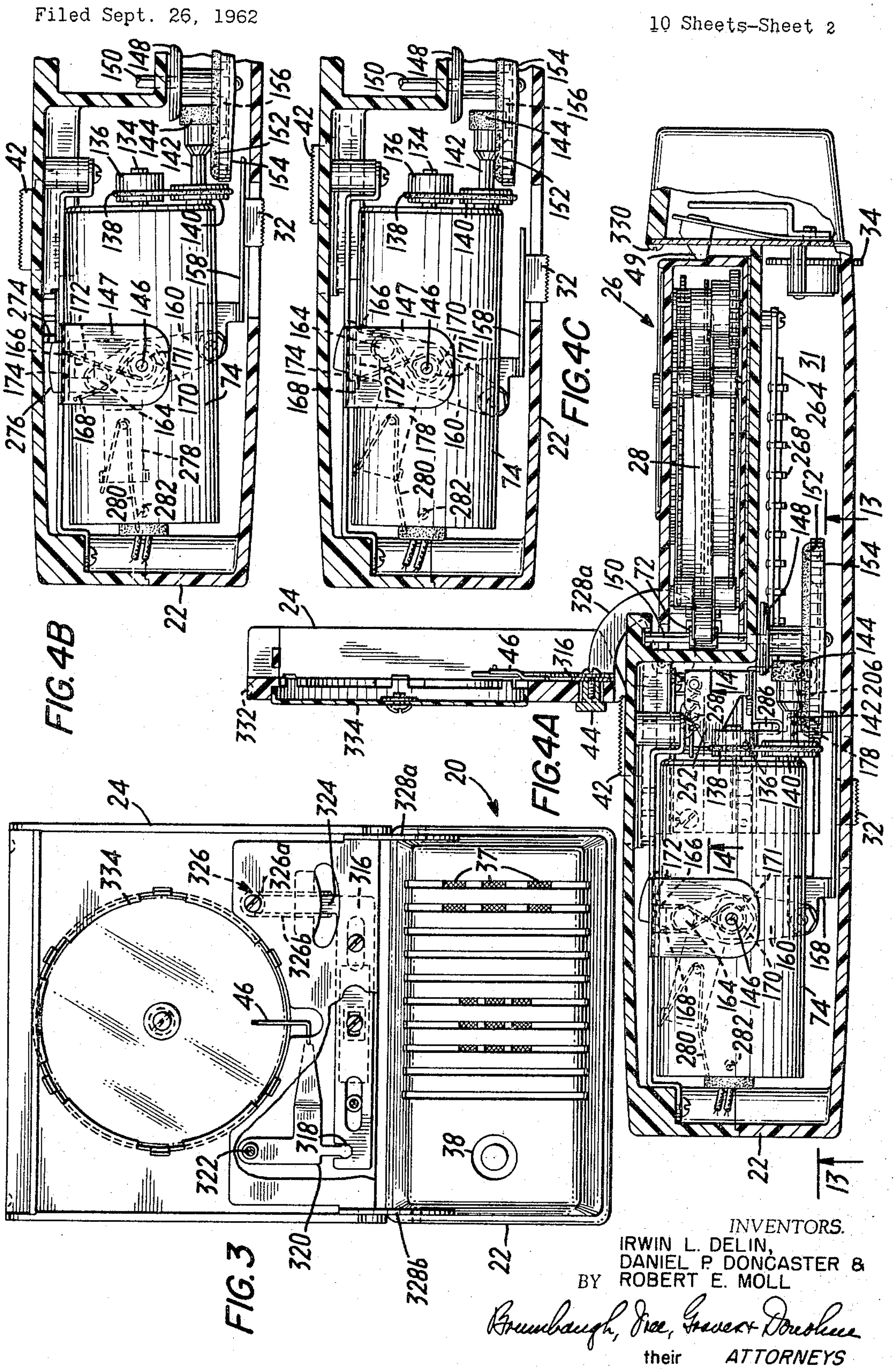
FIG. 3 is a front end view of the dictating machine shown in FIG. 1, with a top cover of the mechanism shown in a raised position and partly cut-away.
Figure 5:
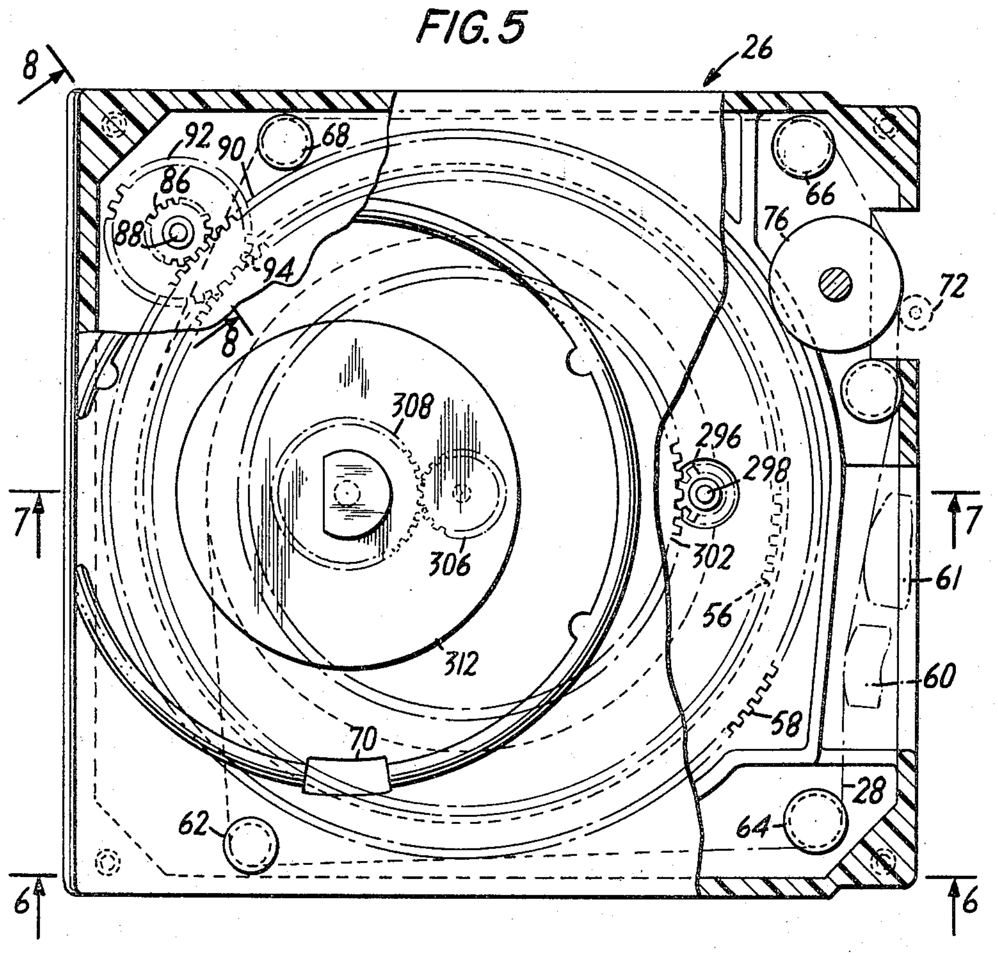
Figure 8:
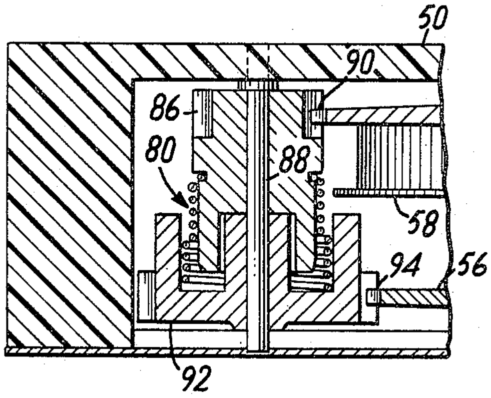
Figure 10:
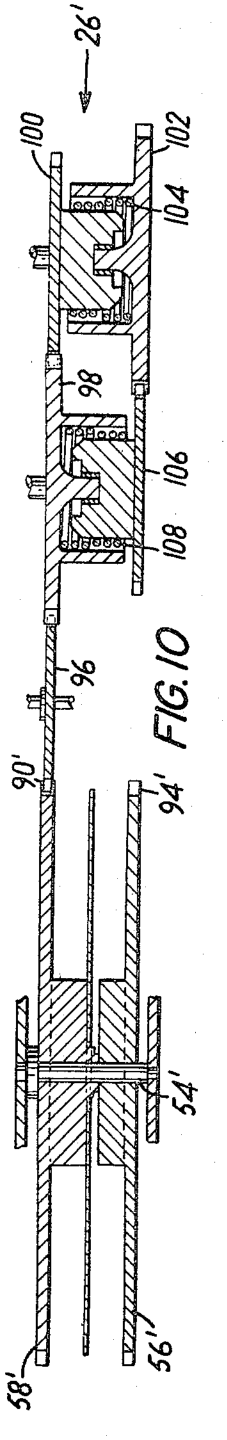
Figure 9:
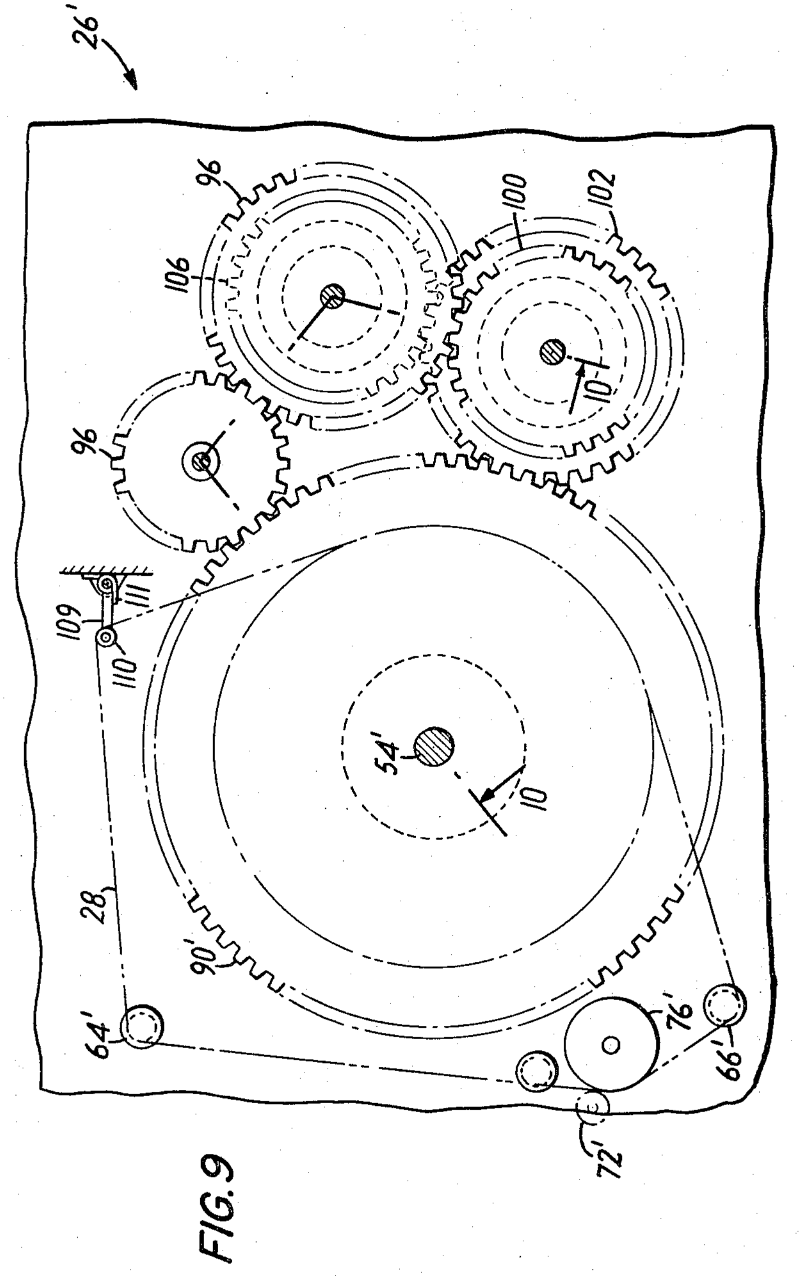
Figure 11A:
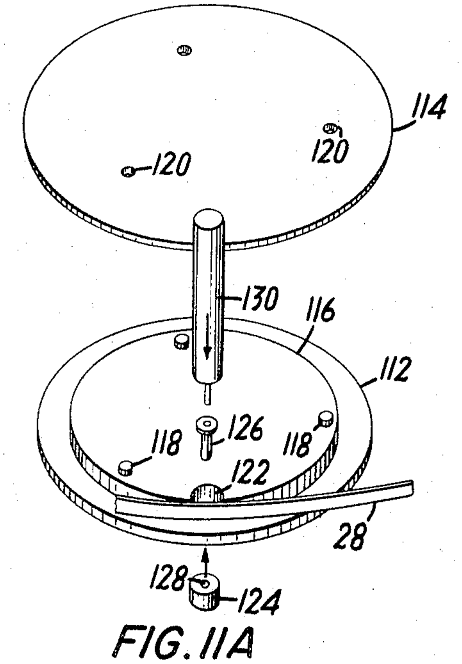
Figure 11B:
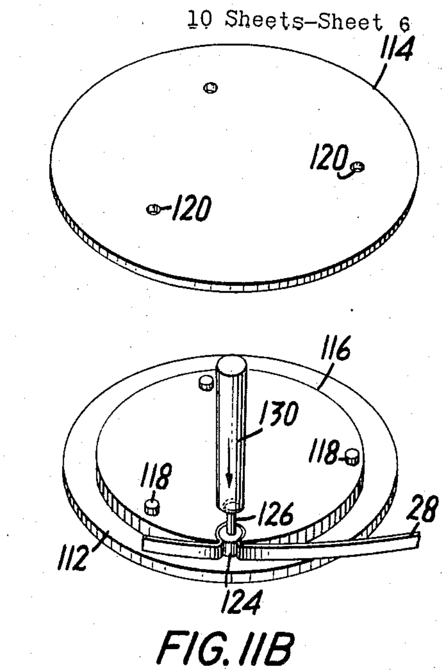
Figure 12A:
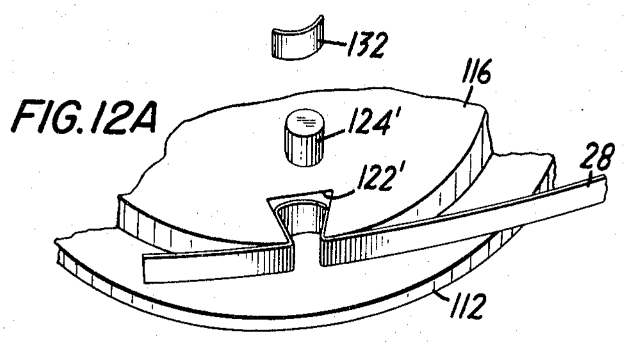
Figure 12B:
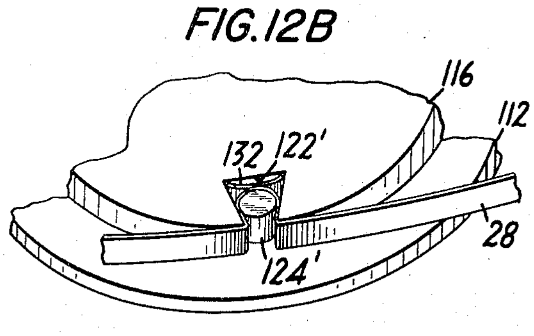
Figure 13:
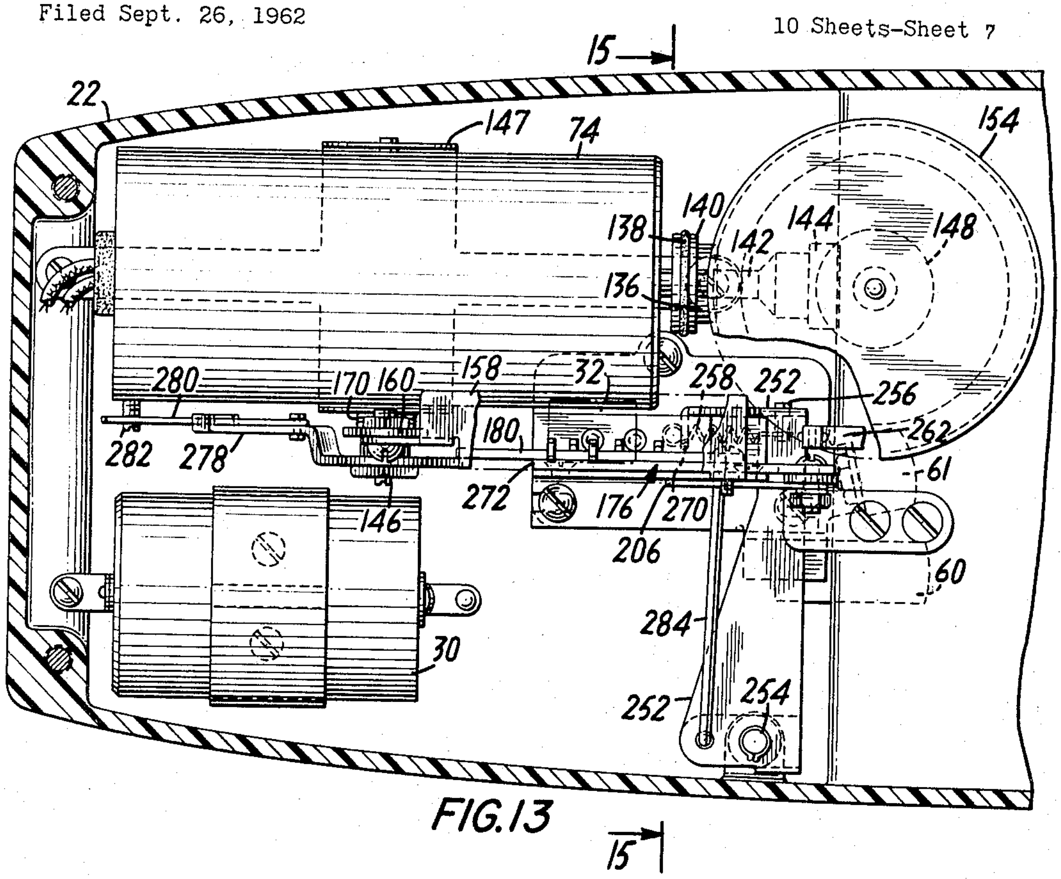
Figure 14:
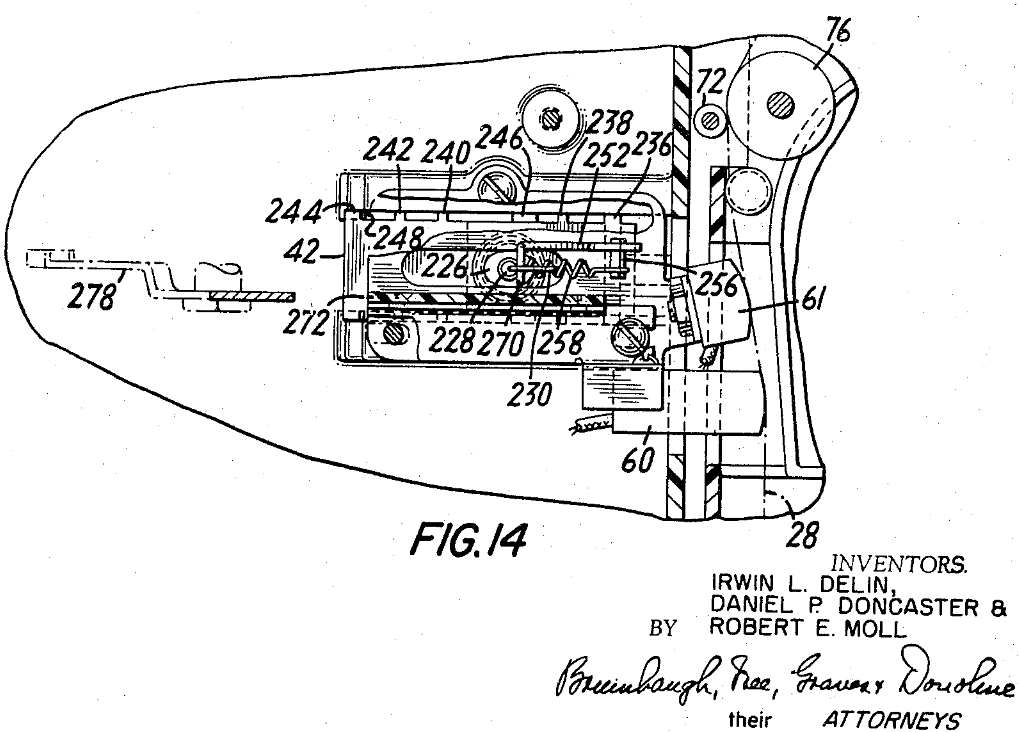
Figure 15:
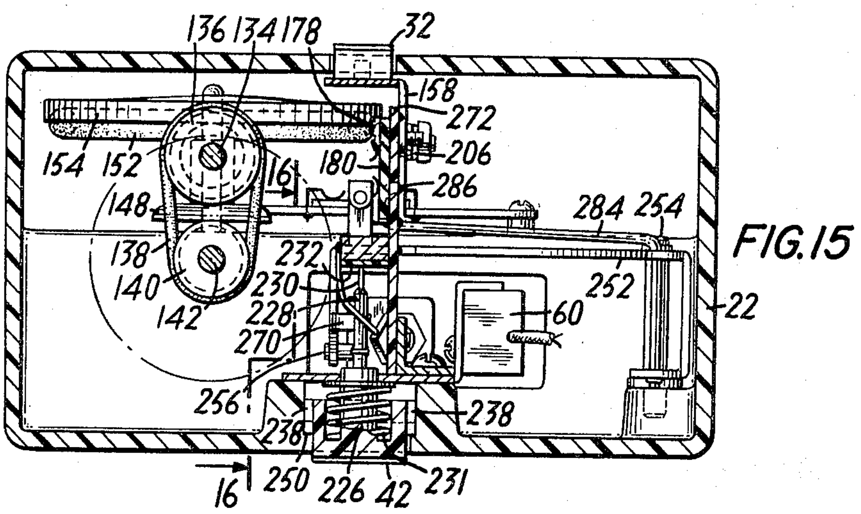
Figures 16A, 16B:
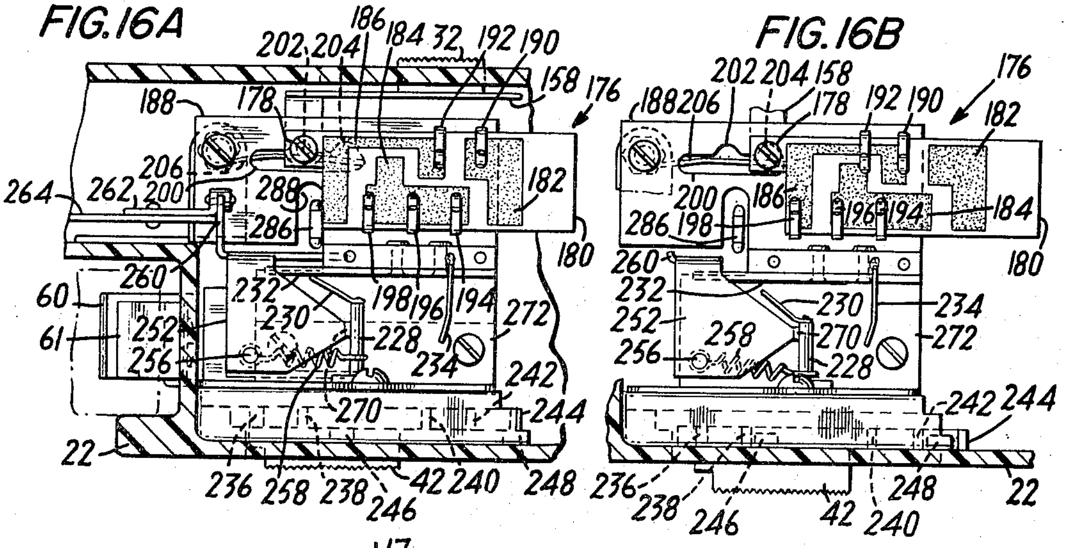
Figure 16C:
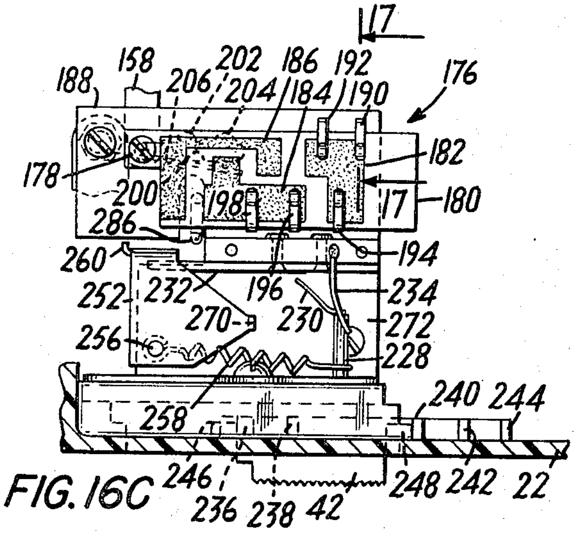
Figure 17:
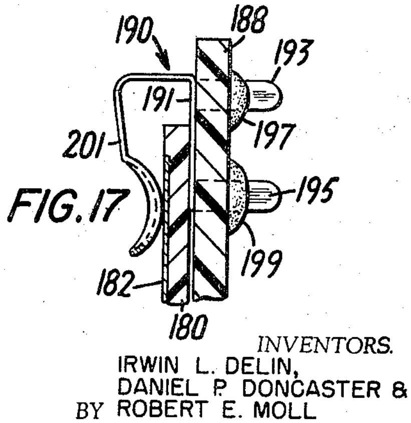
Figure 18:
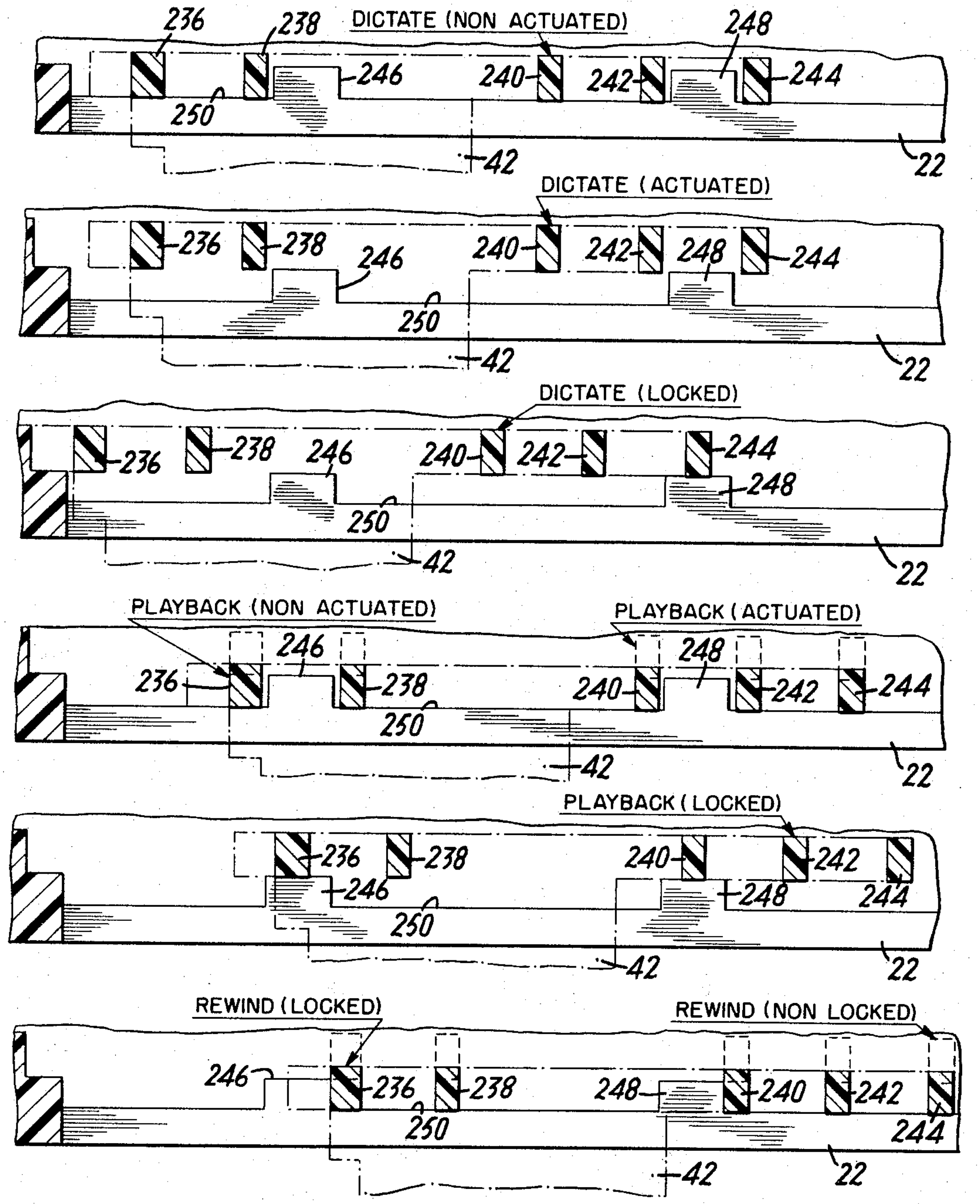
Figures 19, 20, 21:
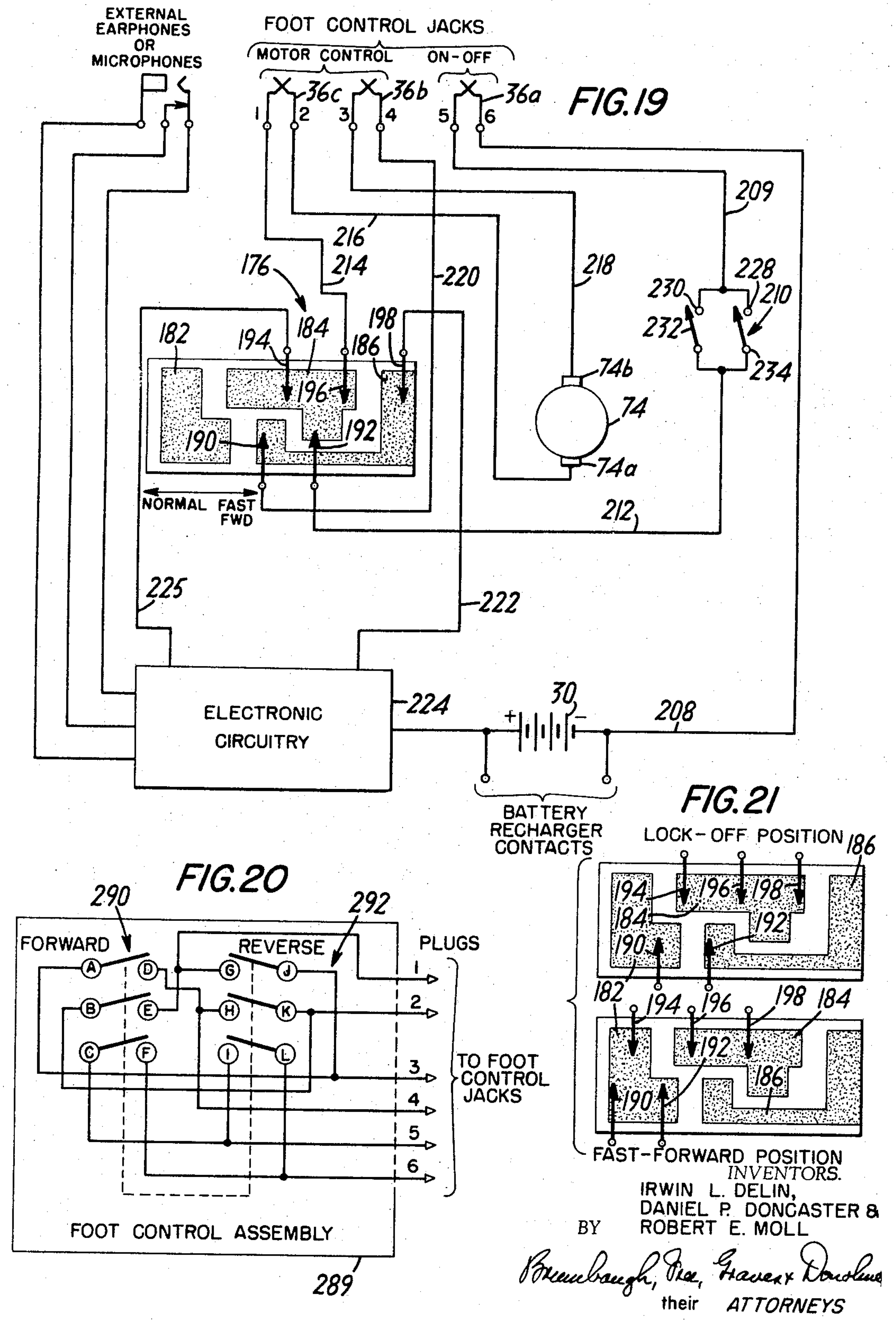

FIGS. 4A, 4B, and 4C are sectional views of the dictating machine shown in FIG. 1, taken generally along the section line 4—4 of that figure and looking in the direction of the arrows with FIG. 4A showing the entire machine in section and FIGS. 4B and 4C showing a drive motor for the machine in two different positions of operation;

FIG. 5 is an enlarged plan view, partially cut away and partially in section, of a tape transport mechanism in accordance with the invention;

FIGS. 6, 7 and 8 are sectional views of the tape transport mechanism shown in FIG. 5, taken generally along the section lines 6—6, 7—7, 8—8, respectively, of that figure and looking in the directions of the arrows;

FIG. 9 is an enlarged plan view of an alternative tape transport mechanism in accordance with the invention;

FIG. 10 is a layout view in section of the tape transport mechanism shown in FIG. 9, taken generally along the section line 10—10 of that figure and looking in the directions of the arrows;

FIGS. 11A and 11B are enlarged, exploded, and perspective views of one of the tape hubs shown in FIG. 7, showing the details of anchoring one end of a tape to the hub;

FIGS. 12A and 12B are enlarged, exploded, and fragmentary views in perspective of one of the tape hubs shown in FIG. 7, showing the details of another arrangement for anchoring one end of a tape to the hub;

FIGS. 13 and 14 are enlarged sectional views of portions of the dictating machine shown in FIG. 4A, taken generally along the section lines 13—13 and 14—14, respectively, of that figure and looking in the direction of the arrows;

FIG. 15 is a sectional view of the portion of the dictating machine shown in FIG. 13, taken generally along the section line 15—15 of that figure and looking in the direction of the arrows;

FIGS. 16A, 16B, and 16C are sectional views of a portion of the part of the dictating machine shown in FIG. 15, taken generally along the section line 16—16 of that figure and looking in the direction of the arrows, showing the switching mechanism of the dictating machine in various positions;

FIG. 17 is an enlarged sectional view of one of the switch contacts shown in FIGS. 16A through 16C;

FIG. 18 is a series of diagrammatic views showing how a dictate-playback-rewind switch of the dictating machine is positioned and retained in each of a plurality of positions; and FIGS. 19, 20, and 21 are detailed schematic circuit diagrams of the switching components of the dictating machine.

GENERAL DESCRIPTION

Figure 2:
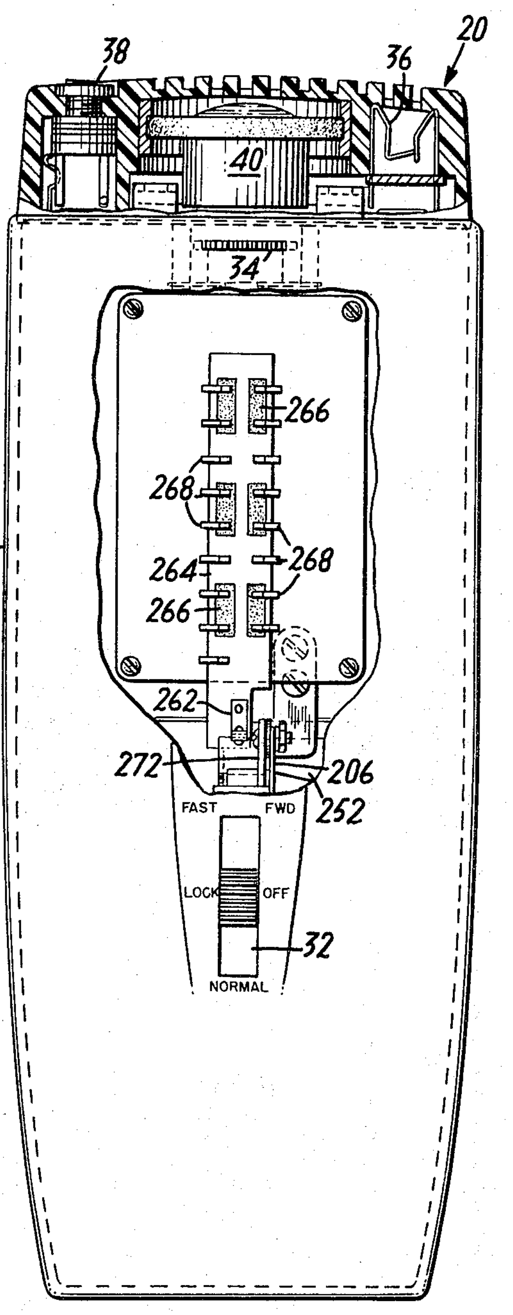
FIG. 2 is a partially cut-away bottom view of the dictating machine shown in FIG. 1.

A pocket-size dictating machine 20 in accordance with the invention is shown generally in FIGS. 1 through 3. It comprises a housing 22 which typically may be 6½ inches long, 2½ inches wide, and 1½ inches deep; a size allowing the machine to be easily carried in a pocket of the user. A hinged cover 24, shown in its open position in FIGS. 3 and 4A, is included to provide easy access to a tape cartridge or tape transport mechanism 26 (FIG. 4A) which carries a recording tape 28 therein. For the purposes of the invention, "tape" herein refers to any flexible record medium.

The tape cartridge 26 is adapted for complete removal from the housing 22 so that one cartridge may be replaced by another. Additionally, with the tape cartridge removed from the housing, access is provided to electronic components (not shown) of the recording-reproducing device which are adapted to be positioned in the housing in a space 31 below the tape cartridge. A battery 30 (FIG. 1) supplies electrical power to the machine.

Located on the bottom portion of the housing 22 (FIG. 2) is a switch 32 which is actuated from a lock-off position, which removes all battery power to the machine, to either a normal speed position or to a fast forward position, both of which determine the speed of movement of the tape 28. The normal tape speed is employed during dictation and playback, while the fast forward speed is useful to accelerate the movement of the tape during a playback when it is desired to skip various portions if the matereial recorded.

Also located on the bottom portion of the housing 22 is a volume control knob 34 (FIGS. 2 and 4A) which regulates the volume of the material played back from the tape 28. A plurality of foot control jacks 36, one of which is shown in FIG. 2, allow the playback functions of the dictating machine to be controlled remotely by a stenographer, for example, when it is desired to play back a recorded message for the purpose of transcription. Access to the jacks is provided through openings 37 (FIG. 3) in the front of the housing, and the openings are not all equidistantly spaced, thereby to ensure that a corresponding plug (not shown) is inserted correctly into the jacks. A microphone-earphone jack 38 (FIGS. 2 and 3) is also included to allow a recording to be made remotely or played back and listened to by a single person using a pair of earphones so as not to disturb other people in the immediate area. Normally, however, a loudspeaker-microphone combination 40 (FIG. 2) contained within the front portion of the housing 22 is used for both recording and playback.

A dictate-playback-rewind switch 42 (FIG. 1) is located on the top portion of the housing 22 and is slid to one of three positions to effect dictation, playback, or rewinding. Disposed on the top portion of the cover 24 is a letter-correction button 44 (FIGS. 1 and 4A) which actuates a stylus 46 disposed beneath the hinged cover to mark suitably an indicating card 48 which moves in accordance with the movement of the tape 28. The instantaneous position of the card 48 is indicative of the amount of recording or playback time remaining in a particular reel of tape, and the markings on the indicating card made by the stylus 46 are indicative of the portions of the tape that carry thereon letters or other dictated material and corrections.

DETAILED DESCRIPTION

*Tape transport mechanism*

The tape cartridge or tape transport mechanism 26 is shown in FIGS. 4A and 5 through 8 and is a complete self-contained unit which is retained within the housing 22 by a spring element 49 (FIG. 4A) and which may be completely removed from the housing to change cartridges. As may be seen from FIGS. 6 and 7, the cartridge comprises a box-like structure typically 2 x 2½ inches and formed from an upper plate 50 and a lower plate 52 between which is positioned an axle 54. A shoulder 55 is included on an end portion of the cartridge 26 which is engaged by the spring element 49 (FIG. 4A) to retain the cartridge within the machine. A hub 56 (FIGS. 6 and 7) which may serve as the supply hub and a hub 58 which may serve as the take-up hub are each mounted for rotation about the axle 54. The supply and take-up hub arrangement may, of course, be such that the hub 58 serves as the supply hub.

The diameter of the hub 56 at the portion receiving the tape 28 may be roughly one inch, while the diameter of the hub 58 at the portion receiving the tape 28 may be roughly 1⅗ inches. With these hub sizes, the hub 58 normally receives 168 wraps of tape which at typical tape speeds results in a seventeen minute dictation or playback time.

The tape 28 is transferred from one of the hubs 56 and 58 to the other during dictation and playback operations, and is thus moved past an erasing transducer 60 and record-playback transducer 61 (FIG. 5). As shown in FIGS. 5 and 6, the tape 28 is guided in its transfer from one of the hubs 56 and 58 to the other by guides 62, 64, 66, and 68. A viewing window 70 (FIGS. 1 and 5) is formed in the upper plate 50 of the cartridge 26 so that the hub flange may be observed to determine if it is properly in motion during dictation or playback. Markings (not shown) on the hub flange facilitate this determination.

To effect the transfer of the tape 28 from one of the hubs 56 and 58 to the other, a rotating capstan 72 (FIGS. 1, 4A, and 5) powered ultimately by a motor 74 (FIGS. 1 and 4A) pinches the tape 28 between it and a cartridge mounted pressure roller 76 (FIG. 5) to drive the tape. Since the power to effect the transfer of tape from one hub to the other is applied directly to the tape, a first slipping spring clutch mechanism 78 (FIG. 7) and a second slipping spring clutch mechanism 80 (FIG. 8) are provided to provide proper rotation and torque of the supply hub 56 and the take-up hub 58.

The first slipping spring clutch mechanism 78 (FIG. 7) operates to drive the take-up hub 58 when the tape 28 is being removed from the supply hub 56 by a clockwise rotation of the capstan 72, as viewed in FIG. 5. Removal of the tape 28 from the supply hub 56 rotates that hub counter-clockwise, and with this direction of rotation the slipping spring clutch 78, located between central portions 82 and 84 of hubs 56 and 58, respectively, couples the hubs together so that the take-up hub 58 is rotated counter-clockwise.

Although the supply and take-up hubs 56 and 58 rotate at the same angular velocity, the velocity of the take-up hub 58 at its perimeter where the tape 28 is reeled thereon would normally be greater than the velocity at the perimeter of the supply hub 56 where the tape is being unwound therefrom due to the difference in diameters of the two hubs. This cannot exist without a breakage of the tape 28, and therefore the slipping spring clutch 78 is designed to provide a slippage in the coupling between the supply hub 56 and the tape-up hub 58 at a relatively high torque when the supply hub is rotated counter-clockwise, thereby to prevent a breakage of the tape and to provide a predetermined tape tension.

During the time that the tape 28 is withdrawn from the take-up hub 58 and is transferred to the supply hub 56, i.e., when the take-up hub drives the supply hub clockwise (as viewed in FIG. 5) as will be explained next, the slipping spring clutch 78 slips at a relatively low torque and effectively provides no coupling between the take-up and supply hubs 58 and 56.

The slipping spring clutch 80 (FIG. 8) is utilized to drive the supply hub 56 clockwise during a rewind operation when the capstan 72 rotates counter-clockwise to remove the tape from the take-up hub 58 and to rotate that hub clockwise, as viewed in FIG. 5. For this purpose, a pinion 86 rotatable about a shaft 88 meshes with gear teeth 90 on the take-up hub 58, as shown in FIGS. 5 and 8. Also mounted for rotation about the shaft 88 is a pinion 92 which meshes with gear teeth 94 on the supply hub 56. The slipping spring clutch 80 couples the pinion 86 to the pinion 92 when the pinion 86 is rotated counter-clockwise by a clockwise rotation of the take-up hub 58. Thus the pinion 92 is rotated counter-clockwise, thereby to rotate the supply hub 56 in a clockwise direction to wind the recording-reproducing tape 28 thereon when the tape is being withdrawn from the take-up hub 58.

Because the pinion 92 is of a diameter larger than that of the pinion 86, the supply hub 56 is rotated at an angular speed faster than that of the take-up hub 58. Normally, for the pinions and hubs shown, the velocity of the supply hub 56 at its perimeter where the tape 28 is reeled thereon would be greater than the velocity at the perimeter of the take-up hub 58 where the tape is being wound therefrom. However, the slipping spring clutch 80 provides a relatively high torque slippage in the coupling between the hubs 58 and 56 to produce a predetermined tape tension and to prevent breakage of the tape.

During the time that the tape 28 is withdrawn from the supply hub 56 and is transferred to the take-up hub 58, i.e., when the supply hub drives the take-up hub counter-clockwise (as viewed in FIG. 5) under the action of the slipping spring clutch 78, the slipping spring clutch 80 slips at a relatively low torque and effectively provides no coupling between the supply and take-up hubs 56 and 58.

As may be noted from the foregoing description, the slipping spring clutch 78 provides the driving of the take-up hub 58 by the supply hub 56, and the slipping spring clutch 80 provides the driving of the supply hub 56 by the take-up hub 58, while each slipping spring clutch effectively decouples the hubs when its normal drive relationship is reversed.

An alternative tape transport mechanism 26' is shown in FIGS. 9 and 10. The mechanism 26' is the same as that disclosed and claimed in copending application Ser. No. 302,213, now U.S. Patent No. 3,219,290 in the name of Irwin L. Delin for "Tape Transport Mechanism," which application is a division of the present application. Referring to these figures, a first hub 56' and a second hub 58' are each independently mounted for rotation about a shaft 54'. The hubs 56' and 58' are of equal diameter and either may serve as the supply hub. An idler gear 96 meshes with gear teeth 90' formed on the periphery of the hub 58'. The idler 96 in turn meshes with a gear 98 that is coupled to a gear 100. The gear 100 is coupled to another gear 102 by a slipping spring clutch 104. The gear 102 meshes with gear teeth 94' formed on the periphery of the hub 56' and meshes also with a gear 106 that is coupled to the gear 98 through a slipping spring clutch mechanism 108.

As shown in FIG. 9, the tape 28 is guided by guides 64', 66', and 68' as it is transferred from one of the hubs 56' and 58' to the other by the action of pressure roller 76' and capstan 72' which pinch the tape 28 therebetween to drive the tape.

In the following description of the operation of the tape transport mechanism 26', it is assumed that the hub 58' is the supply hub, that the hub 56' is the take-up hub, and that the supply hub 58' is rotated clockwise (as viewed in FIG. 9) when the tape 28 is removed therefrom. As the hub 58' is rotated clockwise, the idler gear 96 is driven counter-clockwise, which in turn drives the gear 98 clockwise. Clockwise rotation of gear 98 results in counter-clockwise rotation of gear 100 which produces a counter-clockwise rotation of gear 102 through the action of the slipping spring clutch 104. For this direction of rotation, the clutch 104 is designed to couple together the gears 100 and 102 with a slippage only at a relatively high torque. The gear 102, rotating counter-clockwise and meshing with gear teeth 94' on the hub 56', drives that hub in a clockwise direction, thereby to wind the tape 28 thereon as it is removed from the hub 58'.

Since the diameter of gear 102 is larger than that of the gear 100, hub 56' would normally be driven faster than the hub 58', which would lead to a breakage of the tape 28. However, the relatively high torque slippage in the coupling between the gears 100 and 102 provided by the slipping spring clutch 104 prevents any breakage and produces a predetermined tape tension as the tape is unwound from the hub 58' and transferred to the hub 56'.

When the tape 28 is withdrawn from the hub 56' and transferred to the hub 58', thereby rotating the hub 56' in a counter-clockwise direction as viewed in FIG. 9, the gear 102 is driven clockwise. With this movement of the gear 102, the slipping spring clutch 104 slips at a relatively low torque and effectively provides no coupling between the gears 102 and 100. The gear 102, however, meshes with the gear 106 and drives this gear counter-clockwise. For this movement of the gear 106, the slipping spring clutch 108 couples the gear 106 to the gear 98 with a slippage only at a relatively high torque, thereby to rotate the gear 98 counter-clockwise. Counter-clockwise rotation of the gear 98 produces a clockwise rotation of the idler gear 96 and therefore a counter-clockwise rotation of the hub 58' to wind the tape 28 thereon as it is removed from the hub 56'.

Since the diameter of gear 98 is larger than that of the gear 106, the hub 58' would normally be driven faster than the hub 56', which would result in breakage of the tape 28. However, the relatively high torque slippage in the coupling between the gears 106 and 98 provided by the slipping spring clutch 108 prevents any breakage and maintains a predetermined tape tension as the tape is taken up by the hub 58' from the hub 56'.

It should be noted that the slipping spring clutch 108 effectively decouples the gears 98 and 106 when the tape 28 is transferred from the hub 58' to the hub 56' and the slipping spring clutch 104 provides the driving power to the hub 56'.

To minimize the effects of vibrations produced by the meshing of the gear teeth in the arrangement shown in FIGS. 9 and 10 on the motion of the tape 28, a low mass, highly compliant member 109 (FIG. 9) is utilized. The member 109, which includes a revolving guide 110 around which the tape 28 passes, is loaded by a spring 111 against one side of the tape. Gear teeth impulses, which may cause the tape tension to vary appreciably, are transmitted to the member 109 and the spring 111 and are absorbed therein to maintain the tape tension relatively constant.

*Anchoring tape end to hub*

FIGS. 11A and 11B show one arrangement for anchoring an end of the tape 28 to either one of the supply or take-up hubs. As shown in FIG. 11A, the hub comprises a bottom plate 112 and a top plate 114. An intermediate disk-shaped hub 116 is formed on the plate 112 and contains pegs 118 that are positioned in holes 120 in the plate 114.

The hub 116 has a hole 122 formed in its periphery for the purpose of securing the end of the tape 28 to the hub 116. A resilient sleeve 124 is positioned against the end of the tape 28 and pushed, along with the tape, into the hole 122 to assume the position shown in FIG. 11B. Following this, a rigid eyelet 126 is inserted into a hole 128 in the resilient sleeve 124 to expand the sleeve in the hole 122, thereby to lock the tape end in place. A tool 130 may be used to accomplish this. After the eyelet 126 is inserted into the sleeve 124, the tool 130 is removed and the top plate 114 is positioned against the hub 116 to complete the assembly.

FIGS. 12A and 12B show an alternative arrangement for attaching an end of the tape 28 to the hub. In this instance, a triangular opening 122′ is cut into the periphery of the hub 116. A resilient sleeve 124′ is inserted into the opening 122′ after a portion of the end of the tape 28 is wrapped thereabout. To ensure that the sleeve 124′ and the end of the tape 28 remain in the triangular shaped opening 122′, a leaf spring 132 is inserted into the opening, as shown in FIG. 12B, and expands the sleeve 124′ so that the sleeve is not easily removed from the opening. This arrangement avoids a loosening of the anchorage of the tape end if the resilient sleeve should shrink upon aging so that it no longer fits snugly in the opening 122′.

*Capstan drive*

The arrangement for driving the capstan 72 by the motor 74 is shown best in FIGS. 4B and 4C. The motor 74 is a single speed motor which drives a shaft 134 that contains a pulley 136 thereon. The pulley 136 is coupled by a belt 138 to a pulley 140 mounted on a freely rotatable shaft 142. One end of the shaft 142 contains a resilient circular drive member 144 attached thereto.

The motor 74 is pivotally mounted about an axis 146 in a supporting strap 147, and when pivoted counterclockwise, as shown in FIG. 4B, the resilient circular drive member 144 is brought into contact with a disk 148 that is attached to a shaft 150 that contains thereon the capstan 72 (FIG. 4A). Thus, contact between the circular drive member 144 and the disk 148 results in a rotation of the disk 148 and therefore a rotation of the capstan 72 when the motor 74 drives the circular drive member 144.

When the motor 74 is pivoted clockwise, as shown in FIG. 4C, the shaft 142, which may be considered to be a second circular drive member, is brought into contact with a resilient ring 152 that is attached to the periphery of a disk 154 that is mounted upon the capstan shaft 150, thereby to drive the capstan 72. The disk 154 contains an indented or cut-out portion 156 adjacent the circular drive member 144 so that when the motor 74 is pivoted clockwise, the circular drive member 144 is not brought into contact with the disk 154.

When the motor 74 is pivoted counter-clockwise as shown in FIG. 4B, the angular velocity in radians of the shaft 150 and thus the angular velocity of the capstan 72 may be expressed as:

$$\frac{r_1}{R_1}\alpha \quad (1)$$

where $\alpha$ is the angular velocity in radians of the shaft 142 and thus the circular drive member 144, $r_1$ is the radius of the circular drive member 144, and $R_1$ is the distance between the center of the disk 148 and the point of contact between the circular drive member 144 and the disk 148.

When the motor 74 is pivoted clockwise as shown in FIG. 4C, the angular velocity in radians of the capstan 72 may be expressed as:

$$\frac{r_2}{R_2}\alpha \quad (2)$$

where $\alpha$ is as defined in expression (1), $r_2$ is the radius of the shaft 142, and $R_2$ is the distance between the center of the disk 154 and the point of contact between the shaft 142 and the ring 152.

The ratio of speeds of the capstan 72 in the two positions of the motor 74, then, may be expressed as:

$$r_1R_2/r_2R_1 \quad (3)$$

and if $r_1$ and $R_2$ are each typically twice as great as $r_2$ and $R_1$, respectively, then the ratio of the two capstan speeds will be roughly 4:1.

It should be noted that because the disk 148 is on one side of the shaft 142 and the disk 154 is on the other side of the shaft, a reversal in the direction of rotation of the shaft 150 and thus the capstan 72 is effected when the motor 74 is pivoted from one speed position to another. As will be pointed out hereinafter with regard to the switching mechanism of the present invention, such a reversal of capstan movement with a change in capstan speed is sometimes desirable. Where it is not desirable, a directional change can be avoided by electrically reversing the power supply to the motor 74, thereby to change the direction of rotation of the motor shaft 134.

*Switching—Lock-off-normal-fast forward*

The lock-off, normal, and fast-forward switch 32 shown in FIG. 2 controls battery power to the dictating machine and the speed of rotation of the capstan 72 in the dictation and playback modes of operation. As shown in FIG. 4A, the switch 32 comprises a switch-arm 158 that is pivotally secured at one end thereof to a link 160 that pivots freely about the axis 146. The link 160 contains a pin 164 thereon that has positioned thereagainst two extending portions 166 and 168 of a spring 170 that is coiled around a hub portion 171 of the link. The extending spring ends 166 and 168 engage a boss 172 that is attached to the motor 74.

When the switch-arm 158 is in the position shown in FIG. 4A, the switch 32 is in its lock-off position. This positions the motor 74 as shown and neither the shaft 142 nor the circular member 144 is in contact with its associated ring 152 or disk 148, respectively, thereby eliminating all mechanical coupling between the motor 74 and the capstan 72.

When the switch 32 and thus the switch-arm 158 are moved to the left, as shown in FIG. 4C, the extending spring segment 168 bears against the boss 172 on the motor 74 and pivots the notor counterclockwise so that the circular drive member 144 is brought into contact with with the ring 152, thereby driving the shaft 150 and therefore the capstan 72 at a relatively slow speed, as described above. The pivotal movement of the motor 74 is limited by a slot 174 in the supporting strap 147 through which the boss 172 extends. This positions of the switch 32 is designated as the normal speed position and indicates that the tape is being driven by the capstan 72 in a "forward" direction suitable for the dictation and playback modes of operation.

When the switch 32 and thus the switch-arm 158 are moved to the right, as shown in FIG. 4B, the extending spring segment 166 bears against the boss 172 on the motor 74 and pivots the motor-clockwise so that the circular drive member 144 is brought into contact with the disk 148, thereby driving the shaft 150 and therefore the capstan 72 at a relatively fast speed, as described above, but at the same time reversing the direction of rotation of the capstan. This position of the switch 32 is designated as the fast forward-position, and is useful to permit accelerated tape movement in the forward direction during playback, for example, when it is desired to skip various portions of the tape. Since the direction of capstan rotation is reversed, provision is made to reverse the polarity of the electrical power supplied to the motor 74, thereby to rotate the capstan 72 in the same direction as it is rotated when the switch 32 is in the normal speed forward position shown in FIG. 4C. This is effected by an electrical switch 176 shown in various positions in FIGS. 16A through 16C.

As shown in FIG. 16A, the switch-arm 158 is coupled by a pin or screw 178 to a switch plate 180 that carries thereon three electrically conducting segments 182, 184, and 186. The pin 178 passes through a terminal board 188 containing electrical contacts 190, 192, 194, 196, and 198. As may be seen, the sliding switch plate 180 and the switch-arm 158 are positioned on opposite sides of the terminal board 188, and the pin 178 slides within a groove 200 formed in the terminal board which contains two indentations 202 and 204. A spring 206 biases the pin 178 into one of the indentations when the pin is in that portion of the groove 200.

The electrical contacts 190 through 198 are each formed as shown in FIG. 17. Using the contact 190 as an example, it is formed with a back plate 191 that is positioned against the terminal board 188. Extensions 193 and 195 of the back plate 191 form prongs that pass through the terminal board and are retained in place by beads of solder 197 and 199, respectively. An extension 201 of the back plate 191 extends outwardly and acts like a spring member biased toward the back plate. This spring-like member contacts the conducting segment 182, for example, of the switch plate 180. By providing the contact 190 with the back plate 191, the solder beads 197 and 199 are not fixed and do not have pressure applied thereto when the switch plate 180 contacts the extension 201 and flexes it outwardly. All the pressure is taken by the back plate 191, and thus the lugs 193 and 195, which are used to position the contact 190 against the terminal board 188 and which form part of the printed circuit (not shown) of the dictating machine, will not loosen.

To explain the reversal of battery potential applied to the motor 74 when the switch 32 is in the fast forward speed position, it will be best to describe first the application of the battery potential to the motor when the switch is in the normal speed forward position. This position of the switch is represented by FIG. 16B and, as may be seen, the pin 178 is retained within the indentation 204 by the spring 206. The conducting segments 182, 184, and 186 of the switch plate 180 are contacted by the electrical contacts 190 through 198, as shown, and this is represented schematically in the circuit diagram of FIG. 19.

Turning to FIG. 19, the negative side of the battery 30 is connected through an electrical lead 208, through normally closed foot control jack *36a*, and through an electrical lead 209 to a normally closed switch 210. The switch 210 is coupled via an electrical lead 212 to the electrical contact 192 which, in this instance, is in electrical connection with the conducting segment 184. The contact 196, also in electrical connection with the contact 184, is coupled via lead 214, through normally closed foot control jack *36c*, and through lead 216 to one terminal *74a* of the motor 74. The other terminal *74b* of the motor 74 is coupled via lead 218, through normally closed foot control jack *36b*, and through lead 220 to the contact 190 which, in this instance, is in electrical connection with the conducting segment 186. Also in electrical connection with the segment 186 is the contact 198 which is connected via a lead 222 to the electronic circuitry of the dictating machine, which is shown in block diagram form as the block 224. Suitable electrical connections within the circuitry of block 224 couple the lead 222 to the positive side of the battery 30. Additionally, the negative side of the battery 30 is applied to the circuitry of block 224 via a lead 225 that is connected to the contact 194 in electrical connection with the segment 184 of negative potential.

Thus, when the switch 32 is in the normal speed forward position, the potential of the battery 30 is applied to the motor 74 so that the terminal *74a* is negative with respect to the terminal *74b*, and this results in a driving of the tape 28 in a forward direction.

When the switch 32 is in the fast forward speed position, as shown in FIG. 16C, the pin 178 is in neither of the indentations 202 and 204, but is positioned in a forward portion of the groove 200. Thus, to retain the switch in this position, the switch 32 must be held forwardly since, as shown in FIG. 4B, the extending spring segment 168 bearing against the pin 164 in the link 160 tends to return the switch 32 to a neutral position corresponding to the lock-off position of the switch.

With the conducting segments 182, 184, and 186 and the contacts 190 through 198 in the positions shown in FIG. 16C and in the lower portion of FIG. 21, the contact 192 is still coupled to the negative side of the battery 30 as shown in FIG. 19, as described above. In this instance, however, the contact 192 is in electrical connection with the segment 182 which is also in electrical connection with the contact 190. The contact 190, as shown in FIG. 19, is coupled via the lead 220, through the normally closed foot control jack *36b*, and through the lead 218 to the motor terminal *74b* which is, therefore, supplied with a negative potential. The other terminal *74a* of the motor is coupled via the lead 216 and the normally closed foot control jack *36c* and the lead 214 to the contact 196 which, in this case, is connected to the segment 184. Also connected to the segment 184 is the terminal 198, which is coupled via the lead 222 to the electronic circuit block 224 and thence to the positive terminal of the battery 30.

Thus, the motor terminal *74a* is connected to the positive side of the battery 30 and, therefore, is positive with respect to the terminal *74b*, a polarity relationship which is the opposite of that when the switch 32 is in the normal speed forward position as described above. Accordingly, with the switch 32 in the fast forward speed position, which normally would be accompanied by a reversal in the direction of rotation of the capstan 72, a corresponding reversal in polarity of the battery potential supplied to the motor 74 is effected, thereby resulting in the capstan rotating in the same direction for both the normal speed forward and fast forward speed positions of the switch 32.

When the switch 32 is positioned in the lock-off position, as shown in FIG. 16A, the pin 178 is retained by the spring 206 in the indentation 202. The electrical connections between the segments 180, 182, and 184 and the contacts 190 through 198 are as shown in this figure and in the upper portion of FIG. 21. As may be seen, the electrical terminal 192, which is connected to the negative side of the battery 30 as described above, is in electrical connection with the segment 186. Since no other one of the contacts 190 through 198 is in connection with this segment 186, the battery 30 is effectively isolated from the motor 74 as well as from the electronic circuit block 224.

SWITCHING-DICTATE-PLAYBACK-REWIND

The dictate, playback, and rewind switch 42 is located on the top of the dictating machine 20, as shown in FIG. 1. The switch itself is best shown in FIGS. 15 and 16A through 16C. Referring to FIG. 15, the switch is rectangular in shape and is formed with a central portion 226 which extends downwardly into the machine. The central portion 226 terminates in an electrically conductive rod-like member 228 which is, in turn, terminated by an electrically conductive flexible wiper 230. A spring 231 surrounds the central portion 226 and urges the switch 42 upwardly with respect to the top of the dictating machine. Thus, for the conductive wiper 230 to form an electrical connection with a contact 232, as shown in FIGS. 15 and 16A, the switch 42 must be pressed inwardly against the action of the spring 231.

The wiper 230 and the contact 232 form a part of the switch 210 shown in FIG. 19 that couples together the electrical leads 209 and 212. As may be seen, then, the wiper and the contact form a major off-on switch for the machine. Therefore, when the machine is in the playback or dictation mode of operation, the switch 42 must be depressed inwardly to connect electrically the wiper and the contact, thereby to supply the battery power to the motor 74 as well as to the electronic circuitry block 224.

When the switch 42 is moved rearwardly to its rewind position, as shown in FIG. 16C, the electrically conductive pin 228 strikes an electrically conductive wiper 234. Referring to FIG. 19, the pin 228 and the wiper 234 form a portion of the switch 210 that is in shunt with the portion just described comprising the wiper 230 and the contact 232. Accordingly, in the rewind position of the switch 42, it is not necessary to depress the switch against the action of the spring 231 to supply power to the motor 74 and to the electronic circuitry block 224.

To aid in the positioning of the switch 42 in its various dictation, playback, and rewind positions, the switch is formed with a plurality of bosses 236, 238, 240, 242, and 244 as shown in FIGS. 15 and 16C. In addition, the housing 22 is itself formed with bosses 246 and 248. FIG. 18 shows diagrammatically the interaction of the bosses 236 through 244 and 246 and 248 in the various positions of the switch 42. Thus, in the dictate (non-actuated) position of the switch, as shown in the top diagram of the figure, when the switch is not depressed inwardly, the bosses 236 through 244 rest upon a shoulder 250 formed in the housing 22 which limits the outward travel of the switch under the action of the spring 231.

The switch 42 in its dictate (actuated) position, i.e., pushed inwardly against the action of the spring 231 to position the wiper 230 against the contact 232, is shown in the second diagram of FIG. 18. As may be seen, the bosses 236 through 244 of the switch 42 are positioned inwardly with respect to the supporting shoulder 250. When the switch is released, it moves to the position shown in the first diagram.

To lock the switch 42 in the dictation position, the switch is moved to the position shown in FIG. 16A to to locate the bosses 236 through 244 as shown in the third diagram of FIG. 18. As may be seen, the boss 244 is positioned upon the housing boss 248, thereby retaining the switch 42 in an inward position and preventing the switch from moving outwardly under the action of the spring 231.

In the dictate positions of the switch 42 just described, a switch follower link 252 is positioned as shown in FIG. 16A. The link, as may be seen from FIGS. 13 and 15, pivots about an axle 254 positioned in the housing 22. The link includes a pin 256 therein, as shown in FIGS. 16A through 16C, to which is secured a spring 258 that is also coupled to the conductive pin 228 that forms a part of the switch 42. As the switch 42 is moved from position to position then, the link 252 pivots about the axle 254 and follows the movement of the switch, unless otherwise restrained. In this regard, it should be noted that the spring 258 is sufficiently "stiff" to ensure that it will not flex and will pivot the link 252 in accordance with the movement of the switch 42.

Also formed on the link 252 is a flange 260 shown in FIG. 16A to which is attached an arm 262. As shown in FIG. 2, the arm 262 forms a portion of a plate 264 containing thereon a plurality of conducting segments 266 which are engaged by a plurality of electrical contacts 268. When the switch 42 is in the dictate position, certain ones of the contacts 266 and 268 are connected together to place the electronic components of the dictating machine in the dictation mode of operation.

When the switch 42 is moved rearwardly to the playback, non-actuated or actuated positions shown in solid and phantom lines, respectively, in the fourth diagram of FIG. 18, the switch bosses 236 through 244 and the housing bosses 246 and 248 occupy the relative positions shown. Further, referring to FIG. 16B, when the switch 42 is so actuated, the spring 258 pulls the link 252 with it so that the link pivots about the axle 254 to assume the position shown. Accordingly, the arm 262 is pulled with the link 252 so that the segments 266 and the contacts 268 of FIG. 2 are connected together for the playback mode of operation. As the switch 42 is moved backwardly to the locked playback position shown in the fifth diagram of FIG. 18, the switch bosses 236 and 240 are positioned upon the housing bosses 246 and 248, respectively, thereby preventing the switch 42 from moving outwardly under the action of the spring 231 and retaining the conductive wiper 230 against the contact 232.

As the swtich 42 is moved backwardly from the locked playback position to the rewind position shown in FIG. 16C, the spring 258 is flexed, since an extension 270 of the link 252 impinges against a plate 272 and prevents further pivoting of the link. The link extension 270 and the plate 252 are clearly shown in FIGS. 13 and 14. The spring tension, then, supplied by the spring 258 is an indication to the user of the dictating machine that the switch 42 is being moved from the locked-playback position to the rewind position, thereby facilitating greatly in the use of the machine and allowing a user to "feel" for the various positions of the switch 42.

If the switch 42 when in the rewind position is released outwardly, the spring 231 shown in FIG. 15 urges the switch to the locked position shown in solid lines in the last diagram of FIG. 18, wherein the switch bosses 236 and 240 are positioned against the shoulder 250 and also against the housing bosses 246 and 248 under the force of the spring 258. In the non-locked rewind position of the switch 42 shown in phantom lines in this same diagram, if the switch 42 is pushed slightly forward so that the switch bosses 236 and 240 ride upon the housing bosses 246 and 248, the switch will be retained in its inward position and, under the action of the flexed spring 258, will be returned automatically to the playback locked position. In this fashion, then, the switch 42 can be easily moved from the locked playback position to the rewind non-locked position to effect a simple "back-spacing" during the playback or dictation of any material. Because of the action of the spring 258, an automatic return of the switch 42 is provided and the machine is quickly placed in the locked playback mode of operation to play back the recorded material embraced by the back space.

When the switch 42 is in the rewind position, as shown in FIG. 4B, a rear portion 274 of the switch strikes a link 276 that is pivotable about the axis 146. The link 276 contains an extension 278 which includes a U-shaped spring 280. As the link 276 and its extension 278 are pivoted counter-clockwise due to the switch 42 being moved to the rewind position, the U-shaped spring 280 is urged against a pin 282 formed in the motor 74, thereby tilting the motor counter-clockwise and effecting fast speed operation of the capstan 72. As pointed out before, pivoting the motor in this fashion not only effects an increase in speed but also a change in direction of rotation of the capstan, and thus the rewind mode of operation is automatically achieved when the switch 42 is positioned in the rewind position.

In this regard, it should be noted that the link 276 and the U-shaped spring 280 provide an overriding action with regard to the link 160 and the spring 164 that form a part of the pivoting mechanism in connection with the normal speed forward, lock-off, and fast speed forward switch 32 described above. To achieve this, the spring 280 may be of a degree of stiffness greater than that of the spring 164 or, alternatively, the spring extension 168 may extend against an edge of the link 276 so that when that link is pivoted counter-clockwise, the extending spring segment is moved away from the boss 172 on the motor 74, thereby releasing the motor from the normal speed position if such was the mode of operation previously effected by the switch 32. As may be seen from FIG. 4C, when the switch 42 is moved forwardly out of the rewind position, the spring 280 has no effect upon the positioning of the motor 74 since the spring is only upon one side of the pin 282.

INTER-ACTING FUNCTIONS

The dictating machine incorporates a feature which prevents the tape 28 from being driven at the fast forward speed during dictation. This is achieved as follows. Referring to FIGS. 13 and 15, the link 252 includes a rod 284 which is pivotally attached in the link and which moves as the link is pivoted about the axle 254. In the dictation mode of operation, when the switch 42 is in the position shown in FIG. 16A, a front portion 286 of the rod 284 extends through an opening 288 in the terminal board 188 and is positioned against the forward edge of the switch plate 180, thereby preventing forward movement of the plate beyond the lock-off position into the fast forward position, as shown in FIG. 16A. In all other positions of the switch 42, the rod end 286 is withdrawn so that it does not protrude through the opening 288 and does not restrict movement of the switch plate 180.

EXTERNAL CONTROL

During the use of the dictating machine by a stenographer for transcription purposes, it is contemplated that the machine will be operated entirely through an external control, such as the foot control assembly 289 shown in FIG. 20, for example. The plugs numbered 1 through 6 are intended to be inserted into the jacks *36c*, *36b*, and *36a* of FIG. 19 to effect connections with the like numbered portions of these jacks. In effect, then, the switching network 176 is replaced by the foot control assembly 289.

In this mode of operation, the stenographer normally positions the dictate-playback-rewind switch 42 in the locked playback position and places the switch 32 in the normal speed position. On-off power to the dictating machine is controlled by the foot control assembly 289 through the plugs 5 and 6 which are electrically connected together by switch contacts C and F of forward control switch 290 or switch contacts I and L of reverse control switch 292.

Normal speed forward operation is achieved by depressing the forward control switch 290, thereby coupling together the switch contacts A and D as well as B and E. This electrically connects together plugs 4 and 3 as well as 1 and 2 which, as may be seen from FIG. 19, is the same as closing the jacks 36*c* and 36*b*. Accordingly, the circuit is electrically as shown in FIG. 19, thereby effecting the normal speed forward mode of operation.

When it is desired to reverse the direction of movement of the recording tape, i.e., to reverse the direction of rotation of the motor 74, the reverse switch 292 of the foot control assembly 289 is depressed, thereby coupling together the switch contacts G and J as well as H and K. This electrically connects together plugs 1 and 3 as well as 2 and 4. As may be seen from FIG. 19, this interchanges the plugs 2 and 3 between the jacks 36*b* and 36*c*. The plugs 2 and 3 are coupled to the terminals 74*a* and 74*b*, respectively, of the motor 74, and, therefore, the potential applied to the motor 74 is reversed to effect a change in direction of rotation of the motor.

In this fashion, no mechanical coupling need be incorporated in the stenographer's transcription equipment. It will be understood, of course, that the speed of movement of the tape 28 normally will be constant for both playback and rewind operations when the dictating machine is placed under external control as just described.

*Marker table drive*

To provide an indication of the amount of tape 28 that has been transferred from one of the hubs 56 and 58 to the other, and to facilitate the production of a record of locations of dictated material on the tape, a marking arrangement is included that forms a portion of the cartridge 26 and which is driven by the take-up hub 58. As shown in FIGS. 5 and 6, take-up hub 58 carries a pinion 296 thereon that is freely rotatable about a shaft 298. The pinion 296 meshes with a gear 300 that is formed on an inside portion of the cartridge plate 50. The pinion 296 also meshes with a circular gear 302 that is freely rotatable about a hub portion 304 attached to the cartridge plate 50. The gear 302 is formed with a central hub portion 306 which contains gear teeth thereon that mesh with a marker table gear 308. The marker tableg ear 308 is attached to a shaft 310, which in turn is attached to a marker table 312 that carries thereon the indicating card 48 shown in FIG. 1.

The gearing arrangement is constructed so that for a predetermined number of revolutions of the take-up hub 58, corresponding roughly to the revolutions necessary for all the tape 28 to be transferred from one of the hubs 56 and 58 to the other, the marker table 312 completes one revolution. For example, for a pinion 296 having 10 teeth thereon, a gear 300 formed with 105 teeth, and a gear 302 formed with 104 teeth with the same pitch diameter as the gear 300 but with a different chord, the gear 302 moves the equivalent of 1 tooth for one complete revolution of the take-up hub 58. Thus, if the hub 306 has 20 teeth and the marker table gear 308 has 34 teeth, the marker table 312 makes one complete revolution for roughly 178 revolutions of the take-up hub 58.

Since the marker table 312 is driven directly by the hub 58, and since both form portions of the same tape cartridge 26, the position of a reference point on the marker table is indicative of a particular portion of the tape 28, and thus no problems of alignment or registration arise during transcription.

*Marker table stylus*

The stylus arrangement for marking the indicator card 48 carried by the marker table 312 is shown best in FIGS. 1, 3 and 4A. The button 44 used in moving the stylus 46 to mark either a letter or correction is formed with a slide 316 contained on the underside of the pivotable cover 24. The slide 316 is formed with a cutout portion 318 that engages a link 320 that is coupled to the stylus 46 which is pivotable about a pivot pin 322 attached to the cover 24 on the underside thereof. The slide 316 also includes a portion 324 which is engaged by a spring 326.

With reference to FIG. 1, the button 44 is moved to the right or left (left for a letter mark and right for a correction mark), thereby moving the slide 316 to the right or to the left and pivoting the link 320. The slide portion 324 engages one of two side portions 326*a* and 326*b* of the spring 326 which tend to urge the slide 316 back to an intermediate position, thereby returning the button 44 to an intermediate position. Thus, as the slide 316 is moved and the link 320 is pivoted, the stylus 46 is moved, marking either a letter notation or a correction notation on the indicating card 48 along a radius of the card.

When the pivotable cover 24 is closed by swinging it on hinges 328*a* and 328*b* and snapping a detent or projection 330 (FIG. 4A) in the housing 22 into an associated indentation 332 in the cover, none of the stylus mechanism is visible except the button 44, the stylus 46, and the indicating card 48 which is viewed through a transparent cover 334.

SUMMARY

From the description of the invention above, it is apparent that a unique dictating machine has been provided which is portable and easily carried in a pocket of the user. The device is subject to modification which will naturally depart from the exact form of the structure shown in the drawings described. The invention, therefore, should be taken to be defined by the following claims.

We claim:

1. A drive, comprising a reversible drive motor, first and second circular drive members driven by the motor, a first driven disk positioned adjacent to the first circular drive member and a second driven disk positioned adjacent to the second circular drive member, a shaft coupled to both of the first and second driven disks, means for selectively urging one of the circular drive members into contact with its associated driven disk and the other of the circular drive members into contact with the other driven disk, whereby the shaft will be driven at one of two different speeds and means for selectively reversing the motor concurrently with said urging so that a change in speed of rotation of the shaft is optionally accompanied by a reversal of the direction of rotation of the shaft.

2. The drive as recited in claim 1, wherein $r_1\alpha/R_1$ is greater than $r_2\alpha/R_2$, where $\alpha$ is the angular velocity in radians of the first and second circular drive members, $r_1$ is the radius of the first circular drive member, $r_2$ is the radius of the second circular drive member, $R_1$ is the distance between the center of the first driven disk and the point of contact between the first driven disk and the first circular drive member, and $R_2$ is the distance between the center of the second driven disk and the point of contact between the second driven disk and the second circular drive member.

3. The drive as recited in claim 2, wherein $r_1$ is greater than $r_2$ and $R_1$ is less than $R_2$.

4. A drive, comprising a motor that actuates a driven shaft, a circular drive member attached to the driven shaft and having a diameter greater than that of the driven shaft, a first disk having both an indented portion thereof that partially encompasses without contact the circular driven member and a rim portion thereof that is positioned adjacent to the driven shaft, a second shaft coupled to the first disk and containing a second disk positioned adjacent to the circular drive member, means for pivoting the motor to one of two positions, the first one of the two positions effecting a contact between the driven shaft and the rim portion of the first disk, the second one of the positions effecting a contact between the circular drive member and the second disk, whereby the second shaft is driven at one of two different speeds.

5. In a tape recording-reproducing mechanism, the combination comprising a drive motor that actuates a driven shaft, first and second circular drive elements of different diameter attached to the driven shaft, a first driven disk positioned adjacent to the first circular drive element and positioned on one side of the driven shaft, a second driven disk positioned adjacent to the second circular drive element on the other side of the driven shaft, an output shaft coupled to both of the first and second driven disks, first means for selectively urging one of the circular drive elements into contact with its associated driven disk, whereby the shaft will be driven at one of two different speeds, and means actuated when one of the circular drive elements is urged into contact with its associated driven disk for reversing the rotation of the drive motor.

6. In a tape recording-reproducing mechanism, the combination comprising a drive motor that actuates a driven shaft, means pivotally mounting the motor for movement between first and second positions, first and second circular drive elements of different diameter attached to the driven shaft, a first driven disk positioned adjacent to the first circular drive element and positioned on one side of the driven shaft, a second driven disk positioned adjacent to the second circular drive element on the other side of the driven shaft, an output shaft coupled to both of the first and second driven disks, a spring member positioned against the motor, and first switch means for moving the spring member to pivot the motor to the first one of its positions, thereby effecting a contact between the first circular drive element and the first driven disk, when the first switch means is placed in a first speed position and to pivot the motor to the second one of its positions, thereby effecting a contact between the second circular drive element and the second driven disk, when the first switch means is positioned in a second speed position, whereby the output shaft will be driven at one of two different speeds.

7. In combination with apparatus as recited in claim 6, a second switch means, and a second spring member actuated by the second switch means in a predetermined position for pivoting the motor to the second one of its two positions regardless of the positioning of the first switch means.

8. In a recording-reproducing mechanism wherein a drive means is movable to one of first and second positions to effect control of the mechanism, means for moving the drive means comprising a first spring member having first and second extending segments, a boss in the drive means positioned between the first and second extending segments, means for selectively engaging and moving the first extending segment away from the second extending segment so that the second extending segment contacts the boss and yieldingly retains the drive means in its first position, and means for selectively engaging and moving the second extending segment away from the first extending segment so that the first extending segment contacts the boss and yieldingly retains the drive means in its second position.

9. In combination with apparatus as recited in claim 8, a second spring member, and link means for moving the second spring member so that it engages a portion of the drive means and yieldingly retains the drive means in its first position regardless of the positioning of the drive means as effected by the first spring member.

10. The combination as recited in claim 9, wherein the second spring member is of a degree of stiffness greater than that of the first spring member.

11. The combination as recited in claim 9, wherein the link means engages the first extending segment and moves it away from the boss.

References Cited

UNITED STATES PATENTS

| | | | |
|---|---|---|---|
| 2,119,218 | 5/1938 | Rodgers | 274—9.1 |
| 2,713,618 | 7/1955 | McNabb | 179—100.2 |
| 2,750,810 | 6/1956 | Jung Jo Hann et al. | 74—202 X |
| 2,751,028 | 6/1956 | Laughlin | 74—202 X |
| 2,782,263 | 2/1957 | Hoehn et al. | 179—100.2 |
| 2,898,771 | 8/1959 | Faulkner | 74—207 |
| 2,983,457 | 5/1961 | Toro | 242—55.12 |
| 2,993,355 | 7/1961 | Forsberg | 74—207 |
| 3,153,939 | 10/1964 | Schuh et al. | 74—202 |

BERNARD KONICK, *Primary Examiner.*

V. P. CANNEY, *Assistant Examiner.*